United States Patent
Lim et al.

(10) Patent No.: US 8,681,266 B2
(45) Date of Patent: Mar. 25, 2014

(54) IMAGE PICKUP APPARATUS, FLASH APPARATUS USABLE WITH IMAGE PICKUP APPARATUS, AND CONTROL METHOD OF IMAGE PICKUP APPARATUS

(75) Inventors: Chae-hoon Lim, Seoul (KR); Kazunori Kashimura, Suwon-si (KR); I-hwa Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 476 days.

(21) Appl. No.: 12/957,492

(22) Filed: Dec. 1, 2010

(65) Prior Publication Data

US 2011/0128402 A1 Jun. 2, 2011

(30) Foreign Application Priority Data

Dec. 2, 2009 (KR) .............................. 2009-0118518

(51) Int. Cl.
*H04N 5/222* (2006.01)
*H04N 5/228* (2006.01)

(52) U.S. Cl.
USPC ......................... 348/371; 348/370; 348/222.1

(58) Field of Classification Search
USPC ....................... 348/370–376, 222.1
See application file for complete search history.

(56) References Cited

U.S. PATENT DOCUMENTS

| 6,693,675 | B1 * | 2/2004 | Abe | 348/373 |
| 2003/0071908 | A1 * | 4/2003 | Sannoh et al. | 348/345 |
| 2006/0215039 | A1 * | 9/2006 | Kobayashi | 348/220.1 |
| 2006/0245007 | A1 * | 11/2006 | Izawa et al. | 358/448 |
| 2006/0261257 | A1 * | 11/2006 | Hwang | 250/216 |
| 2008/0000119 | A1 * | 1/2008 | Chen | 40/414 |
| 2008/0273112 | A1 * | 11/2008 | Sladen | 348/370 |
| 2009/0073275 | A1 * | 3/2009 | Awazu | 348/222.1 |
| 2009/0284647 | A1 * | 11/2009 | Yanai et al. | 348/371 |

* cited by examiner

*Primary Examiner* — Timothy J Henn
*Assistant Examiner* — Pritham Prabhakher
(74) *Attorney, Agent, or Firm* — Stanzione & Kim, LLP

(57) ABSTRACT

An image pickup apparatus includes a main body having an image sensor, a flash apparatus having a flash unit installed to the main body to selectively protrude from the main body and to rotate in the protrusion, and a controller to determine whether to protrude the flash unit by determining whether the main body is disposed in an indoor location or in an outdoor location through an image sensor and locating a face of a person in a subject captured by the image sensor, and to control a flash direction by rotating the flash unit in accordance with surroundings of the face of the person in the subject image after protruding the flash unit.

24 Claims, 11 Drawing Sheets

IMAGE PICKUP APPARATUS, FLASH APPARATUS USABLE WITH IMAGE PICKUP APPARATUS, AND CONTROL METHOD OF IMAGE PICKUP APPARATUS

CROSS-REFERENCE TO RELATED APPLICATIONS

This application claims priority under 35 U.S.C. §119 (a) from Korean Patent Application No. 2009-0118518, filed on Dec. 2, 2009, in the Korean Intellectual Property Office, the disclosure of which is incorporated herein in its entirety by reference.

BACKGROUND

1. Field of the Invention

The present general inventive concept relates generally to an image pickup apparatus using an image sensor. More specifically, the present general inventive concept relates to an image pickup apparatus of photographing using a flash apparatus and a control method of the image pickup apparatus.

2. Description of the Related Art

When an amount of light is deficient, an image pickup apparatus, such as digital camera or a digital camcorder, for photographing utilizes a flash apparatus, such as a flash or a stroboscope, with an image sensor to photograph an image.

The flash apparatus can be classified as an embedded flash apparatus which is integrally formed with a main body of the image pickup apparatus, and an external flash apparatus which is formed separately from the main body and attached to the main body of the image pickup apparatus when necessary.

The embedded flash apparatus, which is formed integrally with the main body of the image pickup apparatus, emits light in a fixed direction and accordingly emits light only in front of a subject. As such, when a person is photographed by using the flash apparatus, which flashes the light in front of the subject, the face of the person becomes shiny and a contrast between the person and a background is too high. As a result, a captured image of the person can be overexposed or the background may not be represented well. Thus, even when a light quantity is deficient while photographing, users tend not to use the flash apparatus.

Meanwhile, when using the external flash apparatus, the user can freely control a flash direction. As such, the user can take a picture by controlling the light direction of the flash apparatus if necessary, which may address the problem associated with the embedded flash apparatus. However, the external flash apparatus is inconvenient because the user must carry the external flash apparatus separately from the image pickup apparatus. In addition, since an average user without expertise in using the camera is unfamiliar with the appropriate light direction according to a status or location of the person to be photographed, it is difficult to properly use the external flash apparatus.

SUMMARY

The present general inventive concept provides an image pickup apparatus, a flash apparatus for the image pickup apparatus, and a control method of the image pickup apparatus to control a light direction of the flash apparatus by recognizing a status of surroundings and of a subject.

Additional features and/or utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image pickup apparatus which includes a main body having an image sensor, a flash apparatus having a flash unit installed to the main body, to selectively protrude from the main body, and to rotate in the protrusion, and a controller to determine whether to protrude the flash unit from the main body by determining whether the main body is disposed in an indoor location or an outdoor location through an image sensor and by locating a face of a person in a subject image captured by the image sensor, and to control a flash direction by rotating the flash unit in accordance with surroundings of the face of the person in the subject image after protruding the flash unit.

The flash apparatus may include a housing to receive the flash unit, an ascending and descending unit formed to selectively protrude the housing from the main body, and a rotation unit to rotate the housing.

The ascending and descending unit may include a base installed below the housing to support an ascent and descent of the housing, an elastic member interposed between the base and the housing, and a fixing member to secure the housing to the main body and to release the housing according to a signal of the controller.

The rotation unit may include a first motor installed below the housing to horizontally rotate the housing with respect to an ascent and descent axis of the housing according to a signal of the controller.

The rotation unit may further include a second motor to vertically rotate the flash unit with respect to the housing.

At least one sensor affecting a result of photographing may be installed to the housing. The sensor affecting the result of the photographing may include an Auto Focus (AF) sensor, an AF fill light, an ultrasonic sensor, an infrared sensor, a temperature sensor, a laser sensor, and a light intensity sensor.

The controller may determine the indoor or the outdoor location by using an Auto Exposure (AE) control and may determine whether to operate the flash apparatus by using the AE control and gain control values.

The controller may determine a rotation angle of the flash unit by detecting the face of the person in the subject image by using a facial recognition algorithm and by locating the face in a screen of the subject image formed by the image sensor.

The controller may detect a direction in which the face looks and controls the flash apparatus so that the flash unit flashes in the direction the face looks.

The controller may determine the face direction by using at least one of a facial contour database and a pupil database.

The foregoing and/or other features and utilities of the present general inventive concept may also be achieved by providing a flash apparatus of an image pickup apparatus, the flash apparatus detachably mounted to a main body of the image pickup apparatus including an image sensor, the flash apparatus includes a flash unit, a rotation unit to rotate the flash unit, a mounting part installed below the rotation unit and detachably mounted to the main body of the image pickup apparatus, and a wire connector to electrically connect a controller of the main body with the flash unit and the rotation unit, wherein, when the flash apparatus is mounted to the image pickup apparatus, the controller controls a flash direction of the flash unit by determining whether the image pickup apparatus is placed in an indoor location or in an outdoor location by using the image sensor, locating a location of a face of a person in a subject image captured by the image sensor, and controlling the rotation unit in accordance with the location of the face.

The foregoing and/or other features and utilities of the present general inventive concept may also be achieved by providing a control method of an image pickup apparatus which includes determining whether to use a flash apparatus by determining whether a shooting location is in an indoor location or in an outdoor location, when the flash apparatus is necessary, recognizing a location and a direction of a face of a person in a screen of a subject image formed by an image sensor, rotating the flash apparatus to correspond to the location and the direction of the face of the person, and taking a picture of the subject while flashing the flash apparatus.

The recognizing of the location and the direction of the face of the person in the subject image screen may determine the direction of the face by using at least one of a facial contour database and a pupil database.

The rotating of the flash apparatus to correspond to the location and the direction of the face of the person may include determining which one of an optimum angle auto rotation mode, a specific angle continuous rotation mode, and a manual rotation mode is a rotation mode set to; in the optimum angle auto rotation mode, calculating a rotation angle of the flash apparatus to correspond to the location and the direction of the face of the person, and when a half shutter operates, lifting and rotating the flash apparatus at the calculated angle.

The rotating of the flash apparatus may correspond to the location and the direction of the face of the person may further include, when the rotation mode is the specific angle continuous rotation mode: when the half shutter operates, lifting and rotating the flash apparatus to a start position, when a full shutter operates, taking a picture while flashing the flash apparatus, rotating the flash apparatus to an opposite direction of the direction of the face at a certain angle and taking a picture while the rotated flash apparatus flashes, and taking a picture by rotating the flash apparatus in a same direction at a same angle and flashing the flash apparatus a set number of times.

According to the flash apparatus, the image pickup apparatus, and the image pickup apparatus control method, when taking a picture, the image pickup apparatus may automatically determine a shooting environment (i.e., an indoor location or an outdoor location) and a status of the subject, for instance a direction a face of the subject faces. Thus, a bounce shooting effect can be attained by controlling a light direction of the flash apparatus and by taking a picture when the bounce shooting is required.

The image pickup apparatus according to an exemplary embodiment of the present general inventive concept can equip a flash apparatus which protrudes outside of the image pickup apparatus with a sensor which affects a photographing result, such as an AF sensor, an AF fill light, an ultrasonic sensor, an infrared sensor, a temperature sensor, a laser sensor, and a light intensity sensor. Therefore, a degree of freedom in a structural design of the image pickup apparatus can be raised and a high quality product can be produced.

The foregoing and/or other features and utilities of the present general inventive concept may also be achieved by providing an image pickup apparatus which includes a main body having an image sensor, a flash apparatus movable between a first position and a second position, the first position disposed within the main body and the second position disposed outside of the main body, and a controller to determine whether to move the flash apparatus to the first or second position based on an amount of light detected by the image sensor.

The controller may determine a location of a portion of an image captured by the image sensor.

The portion of the subject in the captured image may correspond to a face of a person.

The controller may recognize the face of the person and a direction of the face by using at least one of a facial recognition algorithm, a facial contour database, and a pupil database.

The image pickup apparatus may further include a rotation unit to rotate the flash apparatus about a first axis and about a second axis perpendicular to the first axis based on the location of the face of the person in the captured image.

The controller may control the flash apparatus and the rotation unit to emit light toward the direction of the face.

The controller may move the flash apparatus from the first position to the second position when the amount of detected light is less than a predetermined amount.

The controller may move the flash apparatus from the second position to the first position when the amount of detected light is larger than a predetermined amount.

The controller may move the flash apparatus from the first position to the second position or from the second position to the first position based on the location of the portion in the captured image.

The foregoing and/or other features and utilities of the present general inventive concept may also be achieved by providing a recording medium having recorded thereon a program to cause a computer system to perform operations in a method of controlling a flash apparatus connectable to a main body of an image pickup apparatus, the method includes detecting an amount of light surrounding the image pickup apparatus, and controlling the flash apparatus to move between a first position and a second position based on the amount of detected light, wherein the first position is disposed within the main body and the second position is disposed outside of the main body.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which

DETAILED DESCRIPTION OF THE EMBODIMENTS

Figure 1:
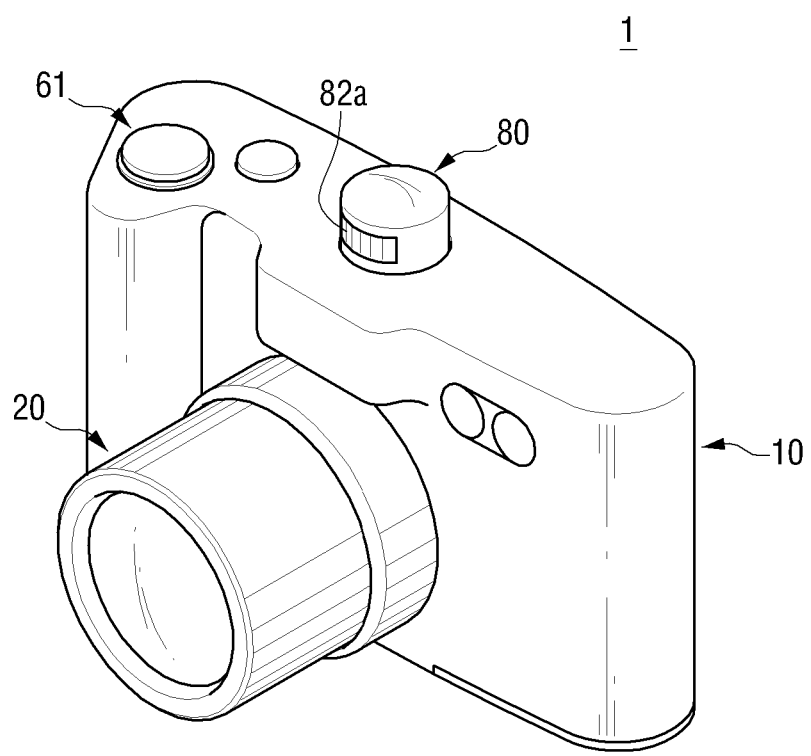
FIG. 1 is a perspective view of a digital camera with a flash apparatus protruding outside of a main body of an image pickup apparatus according to an exemplary embodiment of the present general inventive concept.

Hereafter, exemplary embodiments of the present general inventive concept provide an image pickup apparatus, a flash apparatus for the image pickup apparatus, and an image pickup apparatus control method by referring to the attached drawings.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The matters defined in the following description, such as detailed construction and element descriptions, are provided as examples to assist in a comprehensive understanding of the invention. However, well-known functions or constructions are not described in detail herein, since they would obscure the present general inventive concept in unnecessary detail.

Figure 2:
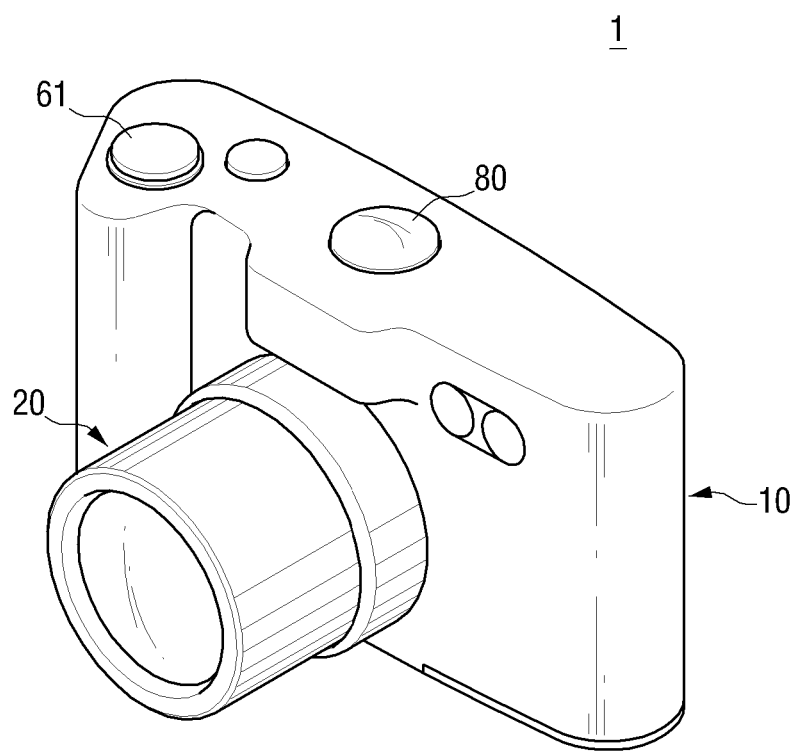
FIG. 2 is a perspective view of the digital camera of FIG. 1 with the flash apparatus inserted into the main body.
Figure 3:
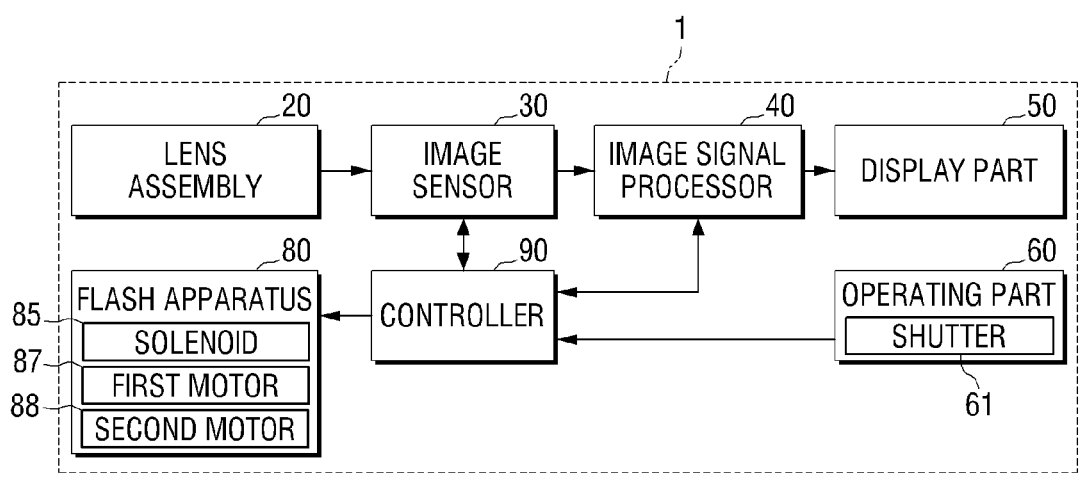
FIG. 3 is a block diagram of the digital camera of FIG. 1.
Figure 4:
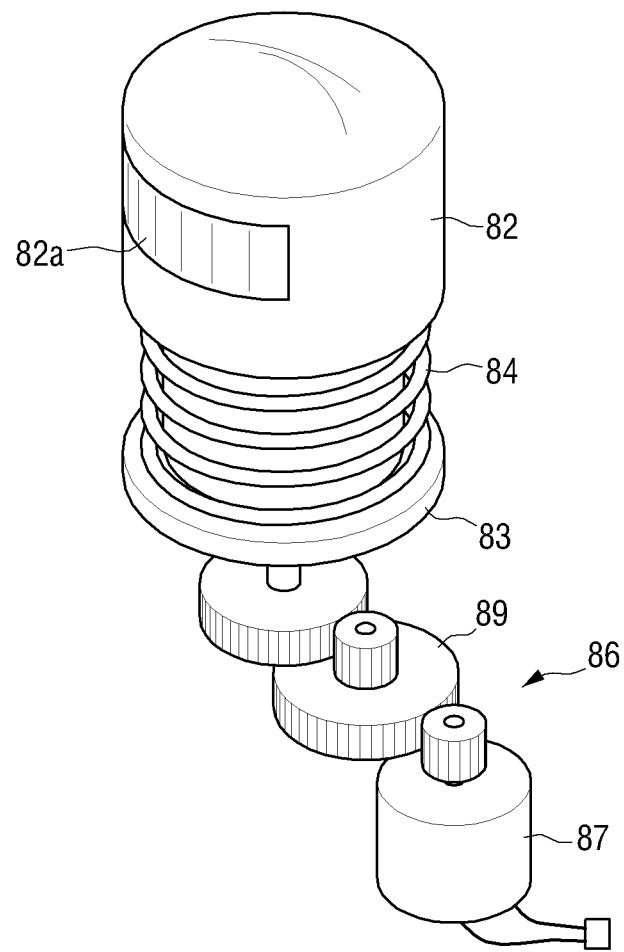
FIG. 4 is a perspective view of the flash apparatus mounted to the digital camera of FIG. 1.
Figure 5:
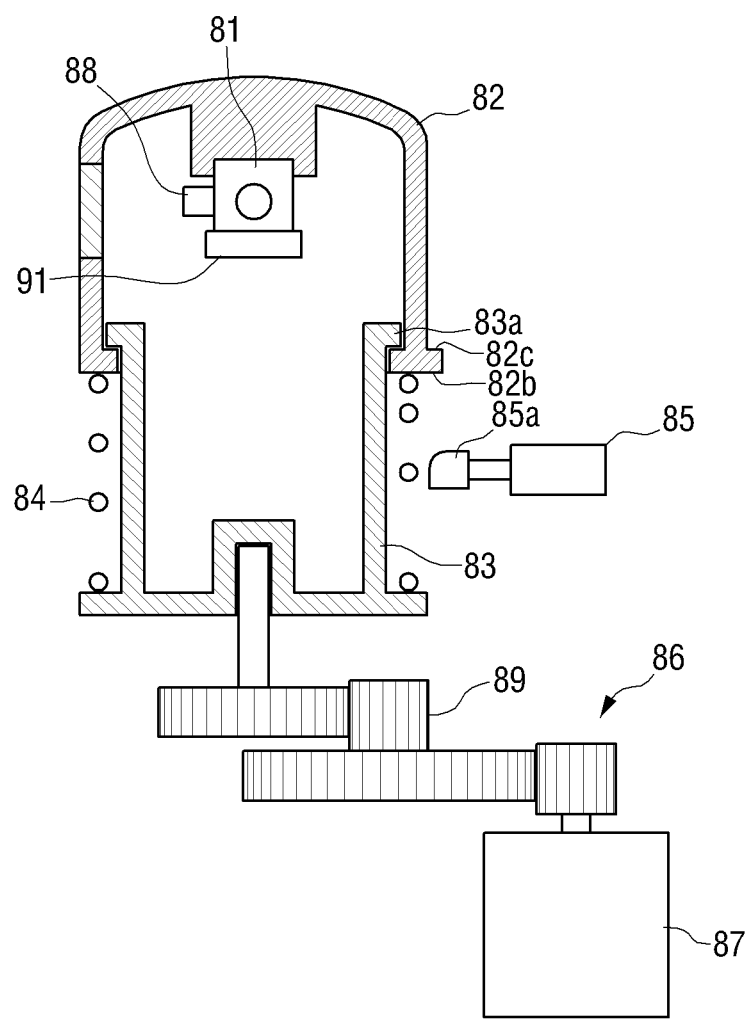
FIG. 5 is a sectional view of the flash apparatus protruding outside the main body of FIG. 1.
Figure 6:
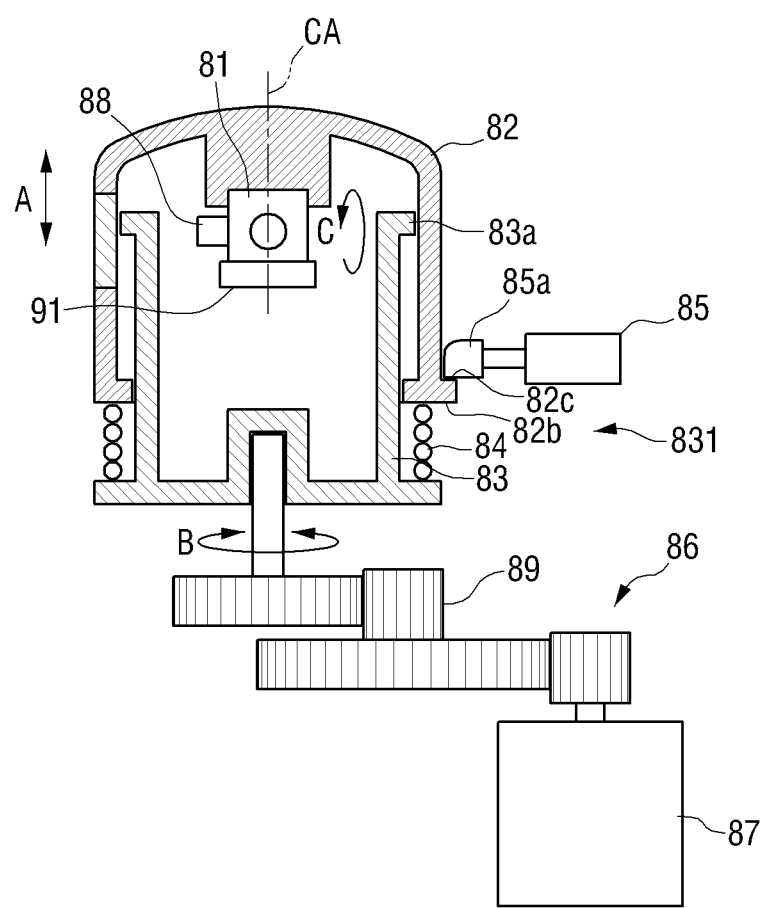
FIG. 6 is a sectional view of the flash apparatus inserted into the main body of FIG. 2.

FIG. 1 is a perspective view of a digital camera with a flash apparatus protruding outside a main body as an example of an image pickup apparatus according to an exemplary embodiment of the present general inventive concept, and FIG. 2 is a perspective view of the digital camera of FIG. 1 with the flash apparatus inserted into the main body. FIG. 3 is a block diagram of the digital camera of FIG. 1, and FIG. 4 is a perspective view of the flash apparatus mounted to the digital camera of FIG. 1. FIG. 5 is a sectional view of the flash apparatus protruding outside the main body of FIG. 1, and FIG. 6 is a sectional view of the flash apparatus inserted into the main body of FIG. 2.

Referring to FIGS. 1, 2 and 3, the image pickup apparatus 1 according to an exemplary embodiment of the present general inventive concept includes a main body 10 and a flash apparatus 80. The image pickup apparatus 1 can include a digital camera, a digital camcorder, etc., to photograph a subject by using an image sensor 30. Hereafter, a digital camera 1 of FIGS. 1 and 2 is explained.

The main body 10 can be equipped with a lens assembly 20, the image sensor 30, an image signal processor 40, a display part 50, a flash apparatus 80, an operating part 60, and a controller 90.

The lens assembly 20 may form an image on a photosensitive surface of the image sensor 30 by receiving light reflected from the subject. The lens assembly 20 can execute a zoom function and automatically control a focus according to a signal of the controller 90 (i.e., a first control signal).

The image signal processor 40 may convert an optical image of the subject formed in the image sensor 30 into an electrical signal and may output the electrical signal to the display part 50 according to a signal of the controller 90 (i.e., a second control signal).

The operating part 60 may include a user interface device to receive manipulation commands relating to a function selection and may be used to operate the image pickup apparatus 1. The operating part 60 can include a shutter 61, a zoom switch, a power switch, etc.

The flash apparatus 80 can protrude a flash unit 81 from the main body 10 and can rotate the flash unit 81 at a certain angle according to a signal of the controller 90 if necessary (see FIG. 5), and can insert the flash unit 81 into the main body 10 if the flash unit 81 is not required. The flash apparatus 80 may be formed so that the flash unit 81 can be inserted into the main body 10 by a user. The flash apparatus 80 functioning as above can be formed in various structures.

FIGS. 4, 5 and 6 depict an example of the flash apparatus 80 which can be built in the digital camera 1. Referring to FIGS. 4, 5 and 6, the flash apparatus 80 can include the flash unit 81, a housing 82, an ascending and descending unit 831, and a rotation unit 86.

The flash unit 81 can emit light according to a signal of the controller 90, and may include a xenon X-tube, a Light Emitting Diode (LED), etc.

The housing 82, which receives the flash unit 81 inside, may be formed to protrude outside the main body 10. The housing 82 includes an opening 82a to release the light emitted from the flash unit 81. In exemplary embodiments, at least one sensor 91 to affect an imaging result can be installed inside the housing 82 in addition to the flash unit 81. The sensor 91 affecting the imaging result may include a sensor which can affect an image captured from the subject by using the image pickup apparatus 1. For example, the sensor 91 can include an Auto Focus (AF) sensor, an AF fill light, an ultrasonic sensor, an infrared sensor, a temperature sensor, a laser sensor, and a light intensity sensor.

The ascending and descending unit 831 is formed to selectively protrude the housing 82 from the main body 10. The ascending and descending unit 831 can include a base 83, an elastic member 84, and a fixing member 85.

The base 83 is installed under the housing 82 and supports the ascent and the descent of the housing 82. That is, the base 83 supports a movement of the housing 82, such that the flash apparatus 80 can selectively move from a position within the main body 10 to a position outside of the main body 10. In exemplary embodiments, the base 83 supports a vertical movement of the housing 82 as indicated by the arrow A. However, the present general inventive concept is not limited thereto. That is, in alternative exemplary embodiments, the base 83 may support a horizontal movement of the housing 82, with respect to the main body 10.

The elastic member 84 is interposed between the base 83 and the housing 82 and elastically supports the housing 82 toward a protrude direction, such as an upward direction. In exemplary embodiments, the elastic member 84 can employ a compression coil spring.

The fixing member 85 secures the housing 82 such that the housing 82 remains inside the main body 10, and releases the housing 82 according to a signal of the controller 90 so that the housing 82 may be elevated by the elastic member 84. However, the present general inventive concept is not limited thereto. That is, the elastic member 84 may provide a force to the housing 82 along the protrude direction in which the housing 82 protrudes from the main body 10. The fixing member 84 can use a solenoid.

In exemplary embodiments, when the user presses an upper part of the housing 82, the housing 82 presses the elastic member 84 and moves in a direction (i.e., downward direction) along the base 83. When the housing 82 descends to a certain depth, a bottom end 82b of the housing 82 contacts a front end 85a of the fixing member 85 and pushes the front end 85a of the fixing member 85 away from a path of the housing 82, while the bottom end 82*b* descends. When the bottom end 82*b* of the housing 82 passes the front end 85*a* of the fixing member 85, the front end 85*a* of the fixing member 85 is forced toward the housing 82 to thereby contact the upper part of the low end 82*b* of the housing 82. Hence, even when the user removes his/her hand after the housing 82 has been completely pressed down, the housing 82 of the flash apparatus 80 stays inside the main body 10, as illustrated in FIG. 2, because a bump part 82*c* disposed above the bottom end 82*b* of the housing 82 is caught beneath the front end 85*a* of the fixing member 85.

At this time, when the fixing member 85 works according to a signal of the controller 90, the front end 85*a* of the fixing member 85 moves in a direction away from the housing 82. When the front end 85*a* of the fixing member 85 retreats, the housing 82 is raised by an elastic force of the elastic member 84 and protrudes upward from the main body 10, as illustrated in FIG. 1. In exemplary embodiments, a rising height of the housing 82 is limited by a stopper 83*a* formed in the base 83.

The rotation unit 86 rotates or turns the flash unit 81 about a first axis (i.e., a horizontal direction) as illustrated by arrow B with respect to an axis CA of the ascending and descending direction of the flash unit 81 and about a second axis (i.e., a vertical direction) as illustrated by arrow C with respect to a vertical surface of the ascending and descending direction axis CA at a certain angle. In exemplary embodiments, the rotation unit 86 can rotate or turn the flash unit 81 vertically and horizontally within a range of about 10 degrees to about 80 degrees. The rotation unit 86 can be constructed in various structures. In the present exemplary embodiment, the rotation unit 86 is installed below a surface of the housing 86 and includes a first motor 87 to horizontally rotate the housing 82 with respect to the axis CA of the ascending and descending direction and a second motor 88 to rotate the flash unit 81 according to a signal of the controller 90, as illustrated in FIGS. 4, 5, and 6. The first motor 87 is connected with a gear power transmitter 89, and the gear power transmitter 89 is connected with a bottom of the base 83. Accordingly, when the first motor 87 rotates, the base 83 rotates. When the base rotates 83, the housing 82 rotates. As a result, the flash unit 81 rotates. The second motor 88 is installed inside the housing 82 to vertically rotate the flash unit 81 with respect to the surface vertical to the axis CA of the ascending and descending direction, for example, with respect to the bottom of the base 83. However, the present general inventive concept is not limited thereto. That is, in alternative exemplary embodiments, the rotation unit 86 may not include the second motor 88 which vertically rotates the flash unit 81 at a certain angle.

The flash apparatus 80 can further include a flash apparatus rotation lever (not illustrated) so that the user can manually rotate the flash apparatus 80. When the flash unit 81 can be rotated left and right and up and down, the flash apparatus rotation lever (not illustrated) to horizontally and vertically rotate the flash unit 81 by hand can be installed.

The controller 90 controls the image pickup apparatus 1 according to a manipulation command of the user input through the operating part 60. The controller 90 can use the conventional technique to control the image signal processor 40 to output the image of the subject formed in the image sensor 30 to the display part 50 and to store the image to a memory according to a shutter signal. Hence, a further description thereof shall be omitted for convenience.

The controller 90 of the image pickup apparatus 1 of an exemplary embodiment of the present general inventive concept includes a bounce photograph function which automatically controls a light direction and a light intensity of the flash apparatus 80 by recognizing surroundings of a shooting location and a face of a person (i.e., a subject) to be photographed.

That is, through the image sensor 30, the controller 90 can determine the surroundings of the image pickup apparatus 1 and determine whether the place where the picture is taken is an indoor location or an outdoor location. The controller 90 can determine the inside location or the outside location by using an Auto Exposure (AE) control. Also, the controller 90 can determine whether it is necessary to take a picture by driving the flash apparatus 80 by using the AE control and the gain control value. The controller 90 can determine the shooting environment and whether to use the flash apparatus 80 by using the AE control and the gain control according to a conventional technique, and therefore a description thereof shall be omitted.

By locating a portion of the subject (i.e., a human face) captured by the image sensor 30, the controller 90 can determine whether the flash apparatus 80 is necessary and a proper flash direction. The controller 90 can recognize the human face in the subject by using a facial recognition algorithm, determine where the face is positioned in the screen formed by the image sensor 30, and thus determine a rotation angle of the flash unit 81. In exemplary embodiments, when the face is positioned on a left side of the screen, the controller 90 rotates the flash unit 81 to flash to an opposite side of the face (e.g., to the right). In so doing, the rotation angle of the flash unit 81 is defined based on the location of the face in the screen. For example, the location of the face in the screen is divided into several groups and the rotation angles of the flash unit 81 corresponding to the several groups can be defined and stored to the controller 90 in the form of a lookup table. In exemplary embodiments, the rotation angles of the first motor 87 and the second motor 88 can be set according to the location of the face in the screen. That is, when the face of the subject is within a predetermined region of the screen, the first motor 87 and/or the second motor 88 may be rotated according to a predetermined rotation angle of the flash unit 81 which corresponds with the predetermined region of the screen. In exemplary embodiments, a number and location of the predetermined regions and a value of the corresponding rotation angles may be adjusted by the user to enhance an image quality.

The controller 90 can recognize the direction of the face in the screen and can control the flash apparatus 80 so that the flash unit 81 flashes toward the face direction. For example, when the face looks at the right side while on the left of the screen, the controller 90 can control the flash apparatus 80 to flash to the right. The controller 90 can determine whether the face looks at the left side or the right side by comparing a database of facial contours stored to a memory with the face in the screen. Alternatively, the controller 90 can recognize the direction of the face by using a direction of a pupil of the subject. That is, the controller 90 can detect the pupil of the face in the screen and recognize the direction of the face by using a database of pupil images.

Hereafter, a control method of the image pickup apparatus, as constructed above, according to an exemplary embodiment of the present general inventive concept is described.

Figure 7:
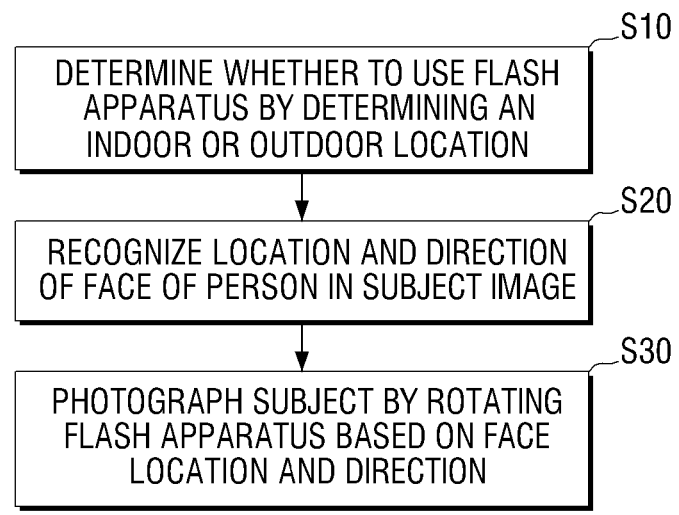
FIG. 7 is a flowchart of an image pickup apparatus controlling method according to an exemplary embodiment of the present general inventive concept.

In FIG. 7, the control method of the image pickup apparatus 1 can include determining whether to use the flash apparatus 80 by checking whether the place where the picture is taken is an indoor or an outdoor location (S10), recognizing, when the flash apparatus 80 is used, the location and the direction of the face of the person in the subject of the screen (S20), rotating the flash apparatus 80 to correspond to the location and the direction of the face of the person, and taking a picture of the subject by causing the flash apparatus 80 to flash (S30).

Figure 8:
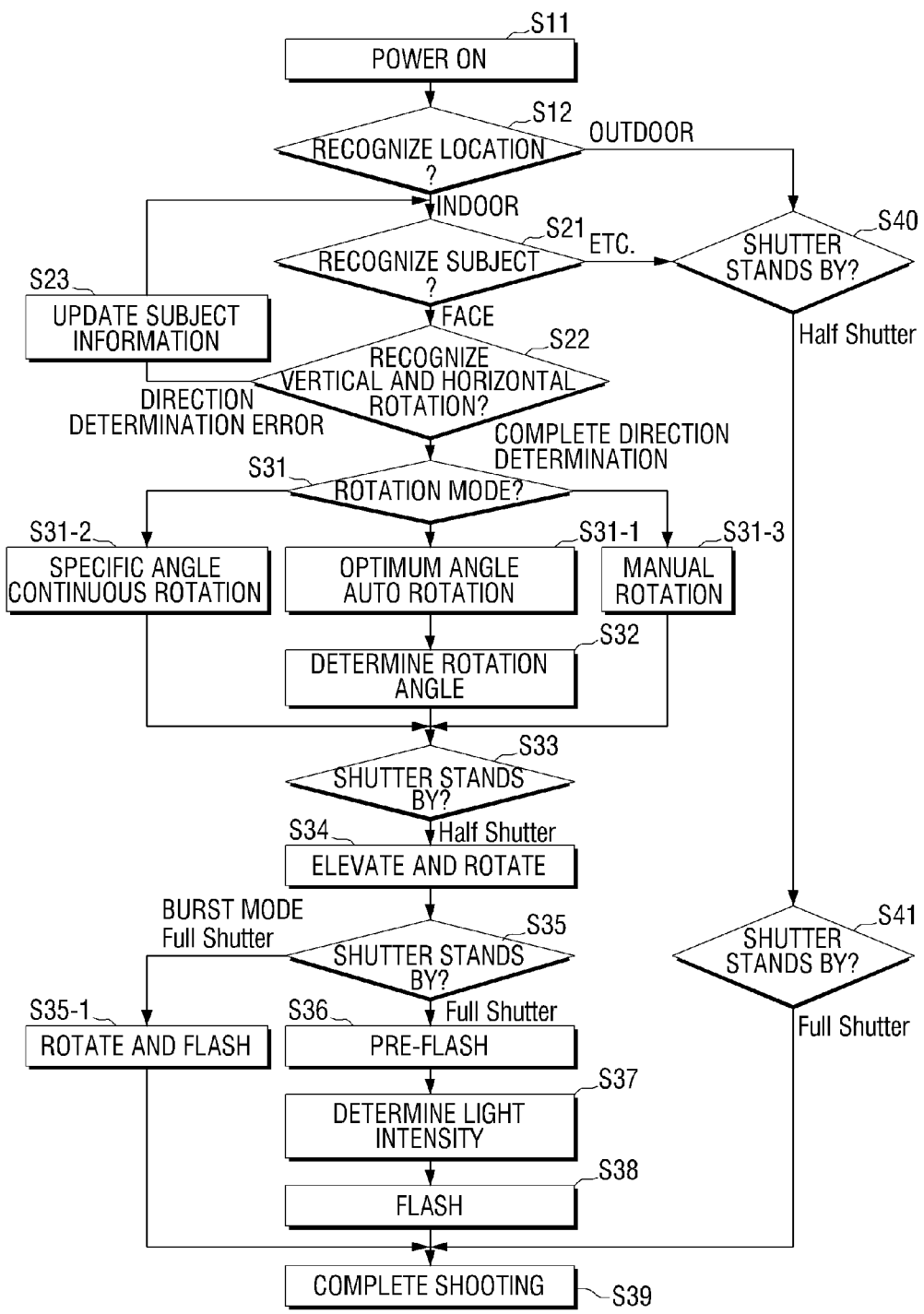
FIG. 8 is a detailed flowchart of an image pickup apparatus controlling method according to an exemplary embodiment of the present general inventive concept.

Hereafter, with the operations of the image pickup apparatus 1, the control method of the image pickup apparatus 1 is explained in more detail by referring to FIGS. 3 and 8.

The user turns on the image pickup apparatus 1 (S11). When the image pickup apparatus 1 is turned on, the controller 90 determines whether the surroundings of the shooting location is an indoor or an outdoor location (S12). At this time, the controller 90 can determine whether the image pickup apparatus 1 is located indoors or outdoors by using the embedded AE control and gain control programs. Upon determining the image pickup apparatus is located in an indoor location, the controller 90 recognizes that it is necessary to take a picture by driving the flash apparatus 80.

Upon determining that the surroundings is indoors, the controller 90 detects whether the face of the person exists in the subject image formed by the image sensor 30 through the lens assembly 20 (S21). When the subject image does not include the face of the person, the controller 90 determines that the flash apparatus 80 is not required and waits for a shutter signal.

On the other hand, when the subject image includes the face of the person, the controller 90 determines where the face is positioned in the screen of the subject image and in which direction the face looks (S22). The controller 90 can recognize the human face in the subject image by using an embedded facial recognition algorithm, and the direction of the face by using a facial contour database or a pupil database.

Next, the controller 90 checks a rotation mode defined in the image pickup apparatus 1 (S31). The rotation mode may be selected by the user, and can include an optimum angle auto rotation mode (S31-1), a specific angle continuous rotation mode (S31-2), and a manual rotation mode (S31-3).

In the optimum angle auto rotation mode (S31-1), the controller 90 calculates the rotation angle of the flash apparatus 80 corresponding to the location and the direction of the face of the person. For example, when the face is on the left of the screen and looks to the right, the controller 90 calculates an angle between a center of the screen and the face location, and then defines the angle as a rotation angle by which the flash unit 81 will rotate to an opposite side of the face location, that is, to the right side.

After calculating the rotation angle of the flash unit 81, the controller 90 waits for a shutter signal (S33). When a half shutter signal is input from the shutter 61, the controller 90 sends a lift signal and a rotation signal to the flash apparatus 80. When the lift signal is issued, the fixing member 85 of the ascending and descending unit operates and the housing 82 ascends and protrudes above the main body 10. Next, the rotation unit 86 receives the rotation signal and causes the first motor 87 to rotate and the second motor 88 to rotate to correspond with the rotation angle determined in the previous step (S34).

After the rotation of the rotation unit 86 is completed, the controller 90 waits for a full shutter signal (S35). When the full shutter signal is input, the controller 90 emits a pre-flash by controlling the flash unit 81 (S36) and determines a light intensity by checking an amount of the light input to the image sensor 30 (S37). Next, the controller 90 controls the flash unit 81 to flash light at a defined light intensity (S38) and then finishes the shooting by storing the image of the subject formed in the image sensor (S39).

Meanwhile, when the rotation mode is set to the specific angle continuous rotation mode (S31-2), the controller 90 directly waits for the input of the shutter signal without calculating the rotation degree of the flash unit 81 (S33). When the half shutter signal is input, the controller 90 elevates the flash unit 81 by controlling the fixing member 85 of the ascending and descending unit and then rotates the flash unit 81 to a start position. In the specific angle continuous rotation mode (S31-2), the start position of the flash unit 81 is stored in the controller 90. For example, the start position can be set to a maximum angle of the rotation of the flash unit 81 toward one direction.

Next, when the full shutter works, the controller 90 allows the flash unit 81 of the flash apparatus 80 to flash and capture a picture. Next, the controller 90 rotates the flash apparatus 80 at a certain angle and captures a picture while flashing (S35-1). The controller 90 continues the shooting by allowing the flash apparatus 80 to rotate and flash a set number of times. Upon completing the flashing and the shooting for the set number of the times, the controller 90 finishes the specific angle continuous rotation mode (S31-2). In so doing, the controller 90 can take a picture by dividing the rotation range of the flash apparatus 80 into three to five sections. For instance, when the rotation range of the flash apparatus 80 is 150 degrees, the controller 90 can flash and take a picture five times while rotating the flash apparatus 80 at intervals of 30 degrees. However, the present general inventive concept is not limited thereto. That is, in alternative exemplary embodiments, the rotation range of the flash apparatus 80 may be divided into five or more sections.

When the rotation mode is set to the manual rotation mode (S31-3), the controller 90 immediately waits for the input of the shutter signal without calculating the rotation angle of the flash unit 81. Before pressing the shutter 61, the user manually rotates the flash apparatus 80 at a certain angle by using the flash apparatus rotation lever (not illustrated). Next, when the user presses the half shutter, the flash apparatus 80 ascends and protrudes above the main body 10. Next, when the full shutter signal is input, the controller 90 takes a picture of the subject in the same manner as stated above.

When the shooting location is an outside location during the situation (i.e., location) recognizing step (S12), the controller 90 does not control the flash apparatus 80 and stands-by until the signal is input from the shutter 61. When the half shutter signal and the full shutter signal are input from the shutter 61 in succession, the controller 90 finishes the shooting of the subject (S40 and S41).

Figure 9:
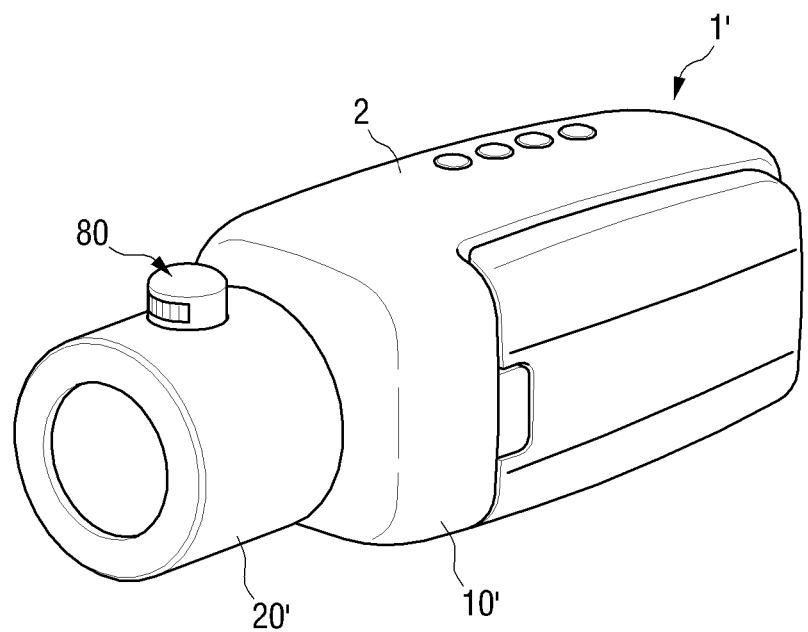
FIG. 9 is a perspective view of a digital camcorder as an example of an image pickup apparatus according to an exemplary embodiment of the present general inventive concept.
Figure 10:
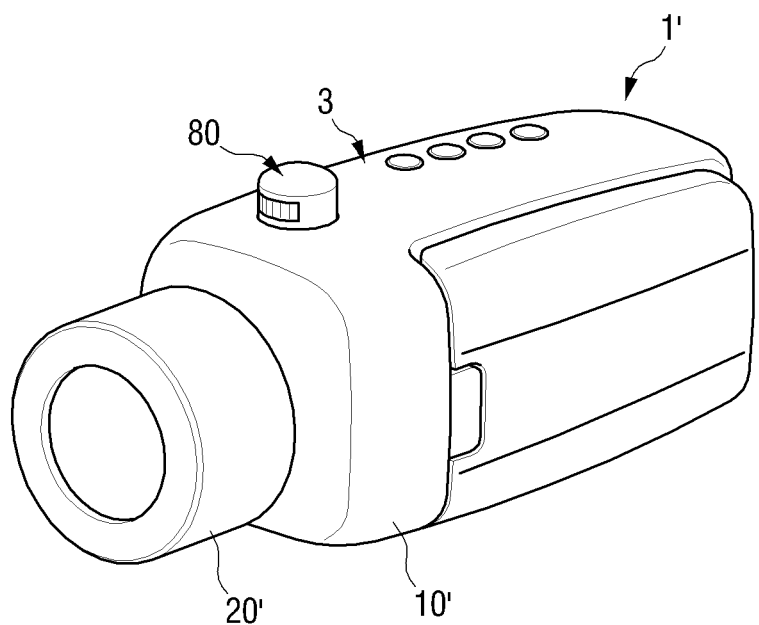
FIG. 10 is a perspective view of a digital camcorder as an example of an image pickup apparatus according to an exemplary embodiment of the present general inventive concept.

FIGS. 9 and 10 depict exemplary embodiments in which the image pickup apparatus 1' is a digital camcorder 2 and 3 according to the present general inventive concept.

In FIG. 9, the flash apparatus 80 is mounted on an upper portion of the lens assembly 20'. In FIG. 10, the flash apparatus 80 is mounted on an upper portion of the main body 10' of the digital camcorder 3.

The flash apparatus 80 used in the digital camcorders 2 and 3 may be substantially the same as the flash apparatus 80 used in the digital camera 1 described above and thus will not described in more detail.

Thus, to take a still image by using the digital camcorder 2 and 3, a controller (not illustrated) of the camcorder 2 and 3 can take the still image with a bounce effect by controlling the flash apparatus 80 in the same manner as the controller 90 of the digital camera 1, as described above.

Figure 11:
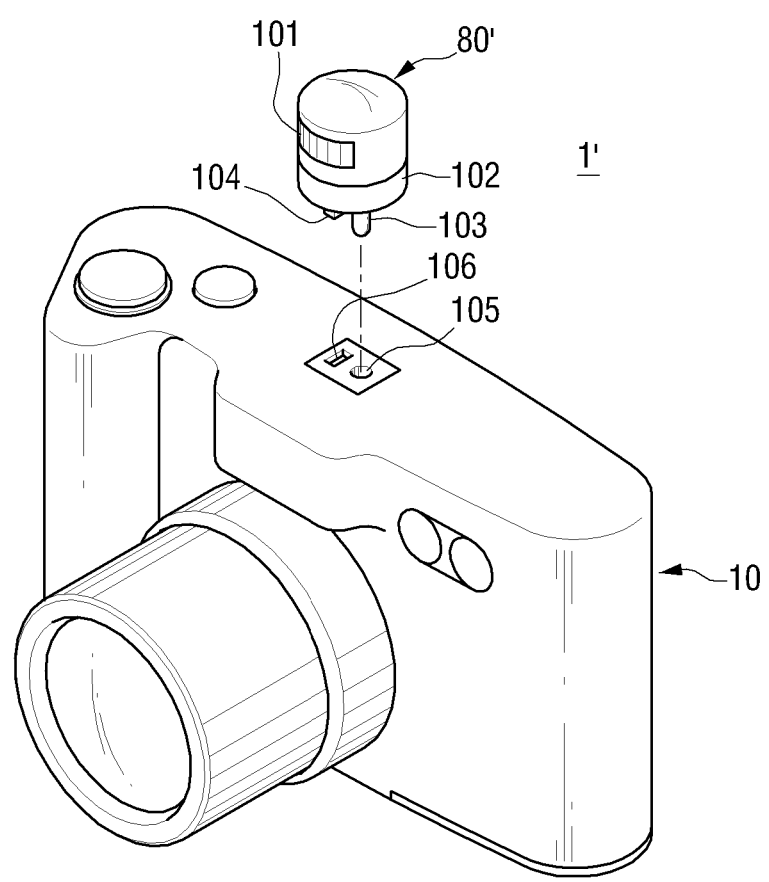
FIG. 11 is a perspective view of a digital camera including an external flash apparatus as an example of an image pickup apparatus according to an exemplary embodiment of the present general inventive concept.

FIG. 11 is a perspective view of an image pickup apparatus 1' including an external flash apparatus 80' according to an exemplary embodiment of the present general inventive concept.

Referring to FIG. 11, the external flash apparatus 80' can be detachably mounted to the main body 10 of the image pickup apparatus 1'. The external flash apparatus 80' includes a housing 101 to receive a flash unit, and a rotation unit 102 to rotate the housing 101. The rotation unit 102 can be of the same or substantially similar structure as the rotation unit 86 of the embedded flash apparatus 80 described above.

In the present exemplary embodiment, a mounting part 103 to detachably mount the flash apparatus 80' to the main body 10 of the image pickup apparatus 1', and a wire connector 104 to electrically interconnect the flash unit and the rotation unit 102 of the flash apparatus 80' with a controller (not illustrated) can be provided under the flash apparatus 80'.

When the mounting part 103 and the wire connector 104 of the flash apparatus 80' are inserted into a mount receiver 105 and a wire connection receiver 106 of the main body 10, the flash apparatus 80' is mounted to the image pickup apparatus 1'. When the flash apparatus 80' is mounted to the image pickup apparatus 1', the controller can control the flash unit and the rotation unit 102 of the flash apparatus 80' through the wire connector 104. Accordingly, the controller can control the rotation unit 102 in accordance with a location and a direction of a face of a subject by determining whether the image pickup apparatus 1' is placed indoors or outdoors through the image sensor, and by determining a location and a direction of the face of the person in the subject image captured by the image sensor. Thus, the controller can fulfill a bounce photographing by controlling a flash direction of the flash unit.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An image pickup apparatus comprising:
   a main body having an image sensor;
   a flash apparatus having a flash unit installed to the main body to selectively protrude from the main body and to rotate in the protrusion; and
   a controller to determine whether to protrude the flash unit by determining whether the main body is disposed in an indoor location or in an outdoor location through an image sensor and by locating a face of a person in a subject image captured by the image sensor, and to control a flash unit direction by rotating the flash unit in accordance with surroundings of the face of the person in the subject image after protruding the flash unit.

2. The image pickup apparatus of claim 1, wherein the flash apparatus comprises:
   a housing to receive the flash unit;
   an ascending and descending unit formed to selectively protrude the housing from the main body; and
   a rotation unit to rotate the housing.

3. The image pickup apparatus of claim 2, wherein the ascending and descending unit comprises:
   a base installed below the housing to support an ascent and descent of the housing;
   an elastic member interposed between the base and the housing; and
   a fixing member to secure the housing to the main body, and to release the housing according to a signal of the controller.

4. The image pickup apparatus of claim 2, wherein the rotation unit comprises:
   a first motor installed below the housing to horizontally rotate the housing with respect to an ascent and descent axis of the housing according to a signal of the controller.

5. The image pickup apparatus of claim 4, wherein the rotation unit further comprises:
   a second motor to vertically rotate the flash unit with respect to the housing.

6. The image pickup apparatus of claim 2, wherein at least one sensor affecting a result of photographing is installed to the housing.

7. The image pickup apparatus of claim 6, wherein the sensor affecting the result of the photographing comprises an Auto Focus (AF) sensor, an AF fill light, an ultrasonic sensor, an infrared sensor, a temperature sensor, a laser sensor, and a light intensity sensor.

8. The image pickup apparatus of claim 1, wherein the controller determines the indoor or the outdoor location by using an Auto Exposure (AE) control and determines whether to operate the flash apparatus by using the AE control and gain control values.

9. The image pickup apparatus of claim 1, wherein the controller determines a rotation angle of the flash unit by detecting the face of the person in the subject image by using a facial recognition algorithm and locating the face in a screen of the subject image formed by the image sensor.

10. The image pickup apparatus of claim 9, wherein the controller detects a direction in which the face looks and controls the flash apparatus so that the flash unit flashes in the direction the face looks.

11. The image pickup apparatus of claim 10, wherein the controller determines the face direction by using at least one of a facial contour database and a pupil database.

12. A flash apparatus of an image pickup apparatus, the flash apparatus detachably mounted to a main body of the image pickup apparatus comprising an image sensor, the flash apparatus comprising:
   a flash unit;
   a rotation unit to rotate the flash unit;
   a mounting part installed below the rotation unit and detachably mounted to the main body of the image pickup apparatus; and
   a wire connector to electrically connect a controller of the main body with the flash unit and the rotation unit,
   wherein, when the flash apparatus is mounted to the image pickup apparatus, the controller controls a direction of the flash unit by determining whether the image pickup apparatus is placed in an indoor location or in an outdoor location through the image sensor, locating a location of a face of a person in a subject image captured by the image sensor, and controlling the flash unit using the rotation unit to correspond with the location of the face.

13. A control method of an image pickup apparatus, comprising:
   determining whether to use a flash apparatus by determining whether a shooting location is in an indoor location or in an outdoor location;
   when the flash apparatus is necessary, recognizing a location and a direction of a face of a person in a screen of a subject image formed by an image sensor;
   rotating the flash apparatus to control a flash apparatus direction to correspond to the location and the direction of the face of the person by using a controller, in accordance with surroundings of the face of the person; and
   taking a picture of the subject while flashing the flash apparatus.

14. The control method of claim 13, wherein the recognizing of the location and the direction of the face of the person in the subject image screen determines the direction of the face by using at least one of a facial contour database and a pupil database.

15. A control method of an image pickup apparatus, comprising:
   determining whether to use a flash apparatus by determining whether a shooting location is in an indoor location or in an outdoor location;
   when the flash apparatus is necessary, recognizing a location and a direction of a face of a person in a screen of a subject image formed by an image sensor;
   rotating the flash apparatus to correspond to the location and the direction of the face of the person, the rotating comprising:
      determining which one of an optimum angle auto rotation mode, a specific angle continuous rotation mode, and a manual rotation mode is a rotation mode set to;
      in the optimum angle auto rotation mode, calculating a rotation angle of the flash apparatus to correspond to the location and the direction of the face of the person; and
      when a half shutter operates, lifting and rotating the flash apparatus at the calculated angle; and
   taking a picture of the subject while flashing the flash apparatus.

16. The control method of claim 15, wherein the rotating of the flash apparatus to correspond to the location and the direction of the face of the person further comprises, when the rotation mode is the specific angle continuous rotation mode:
   when the half shutter operates, lifting and rotating the flash apparatus to a start position;
   when a full shutter operates, taking a picture while flashing the flash apparatus;
   rotating the flash apparatus to an opposite direction of the direction of the face at a certain angle and taking a picture while the rotated flash apparatus flashes; and
   taking a picture by rotating the flash apparatus in a same direction and at a same angle and flashing the flash apparatus a set number of times.

17. An image pickup apparatus, comprising:
   a main body having an image sensor;
   a flash apparatus movable between a first position and a second position, the first position disposed within the main body and the second position disposed outside of the main body; and
   a controller to determine whether to move the flash apparatus to the first or second position based on an amount of light detected by the image sensor, and to control a flash unit direction by rotating the flash unit in accordance with surroundings of a portion of an image captured by the image sensor when the flash apparatus is in the second position, the portion of the image corresponding to a face of a person.

18. The image pickup apparatus of claim 17, wherein the controller determines the location of the portion of the image captured by the image sensor.

19. The image pickup apparatus of claim 18, wherein the controller recognizes the face of the person and a direction of the face by using at least one of a facial recognition algorithm, a facial contour database, and a pupil database.

20. The image pickup apparatus of claim 18, wherein the controller moves the flash apparatus from the first position to the second position or from the second position to the first position based on the location of the portion in the captured image.

21. The image pickup apparatus of claim 17, wherein the controller moves the flash apparatus from the first position to the second position when the amount of detected light is less than a predetermined amount.

22. The image pickup apparatus of claim 17, wherein the controller moves the flash apparatus from the second position to the first position when the amount of detected light is larger than a predetermined amount.

23. An image pickup apparatus, comprising:
   a main body having an image sensor;
   a flash apparatus movable between a first position and a second position, the first position disposed within the main body and the second position disposed outside of the main body; and
   a controller to determine whether to move the flash apparatus to the first or second position based on an amount of light detected by the image sensor, to determine the location of a face of a person captured by the image sensor, the controller recognizing the face of the person and a direction of the face by using at least one of a facial recognition algorithm, a facial contour database, and a pupil database; and
   a rotation unit to rotate the flash apparatus about a first axis and about a second axis perpendicular to the first axis based on the location of the face of the person in the captured image.

24. The image pickup apparatus of claim 23, wherein the controller controls the flash apparatus and the rotation unit to emit light toward the direction of the face of the person.

* * * * *